(12) United States Patent
Abe et al.

(10) Patent No.: US 7,959,425 B2
(45) Date of Patent: Jun. 14, 2011

(54) INJECTION MOLDING MACHINE HAVING AN ELECTRICAL DISCHARGE SYSTEM

(75) Inventors: Koji Abe, Ome (JP); Kentaro Tomioka, Sayama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/652,403

(22) Filed: Jan. 5, 2010

(65) Prior Publication Data

US 2010/0203188 A1 Aug. 12, 2010

(30) Foreign Application Priority Data

Feb. 6, 2009 (JP) ................................ 2009-026266

(51) Int. Cl.
*B29C 45/14* (2006.01)
(52) U.S. Cl. ....................... 425/122; 425/127; 425/129.1
(58) Field of Classification Search .................. 425/122, 425/127, 129.1
See application file for complete search history.

(56) References Cited

U.S. PATENT DOCUMENTS

| | | | | |
|---|---|---|---|---|
| 3,324,508 A | * | 6/1967 | Dickinson | .................. 425/126.1 |
| 6,296,472 B1 | | 10/2001 | Ito et al. | |
| 6,461,558 B1 | * | 10/2002 | Berghoff | ..................... 425/126.1 |
| 6,491,508 B1 | * | 12/2002 | Kurosawa et al. | ............ 425/116 |

FOREIGN PATENT DOCUMENTS

| | | |
|---|---|---|
| JP | 61-297115 | 12/1986 |
| JP | 03-247370 | 11/1991 |
| JP | 10-095028 | 4/1998 |
| JP | 10-128787 | 5/1998 |
| JP | 2002-313850 | 10/2002 |
| JP | 2005-047694 | 2/2005 |
| JP | 2005-294853 | 10/2005 |
| JP | 2006-044014 | 2/2006 |

* cited by examiner

*Primary Examiner* — Tim Heitbrink
(74) *Attorney, Agent, or Firm* — Blakely, Sokoloff, Taylor & Zafman LLP

(57) ABSTRACT

According to one embodiment, an injection molding machine includes a first die and a second die, a driving mechanism configured to move the second die between the first position and the second position, a holder configured to hold a film for in-mold formation, the film including metallic sheets used for covering the surface of the molded product, and an electric discharge mechanism. The electrical discharge mechanism is moved to a contact position with movement of the second die from the first position to the second position, used as a driving source. The electrical discharge mechanism is moved to a retracted position with movement of the second die from the second position to the first position, used as a driving source.

8 Claims, 10 Drawing Sheets

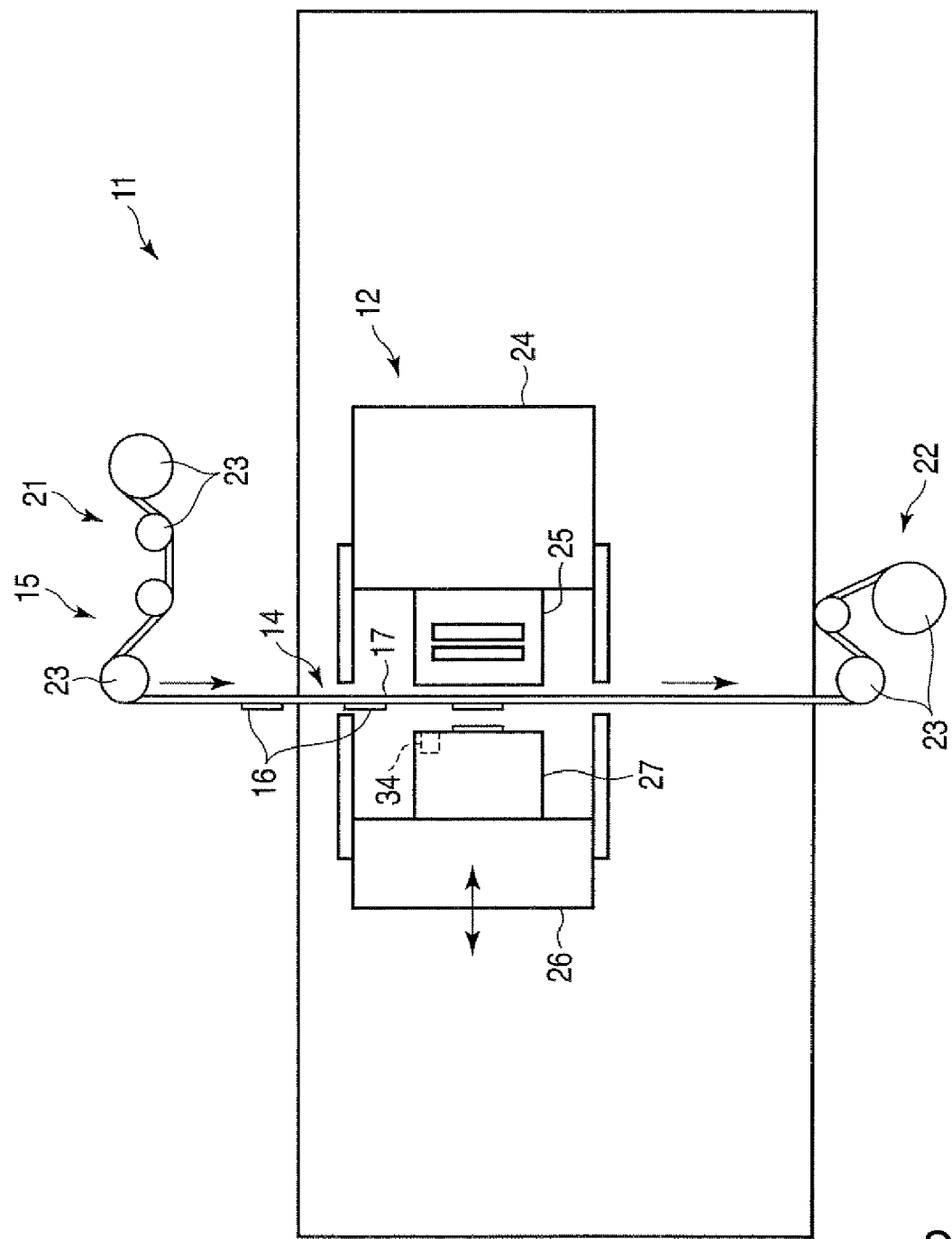
F I G. 2

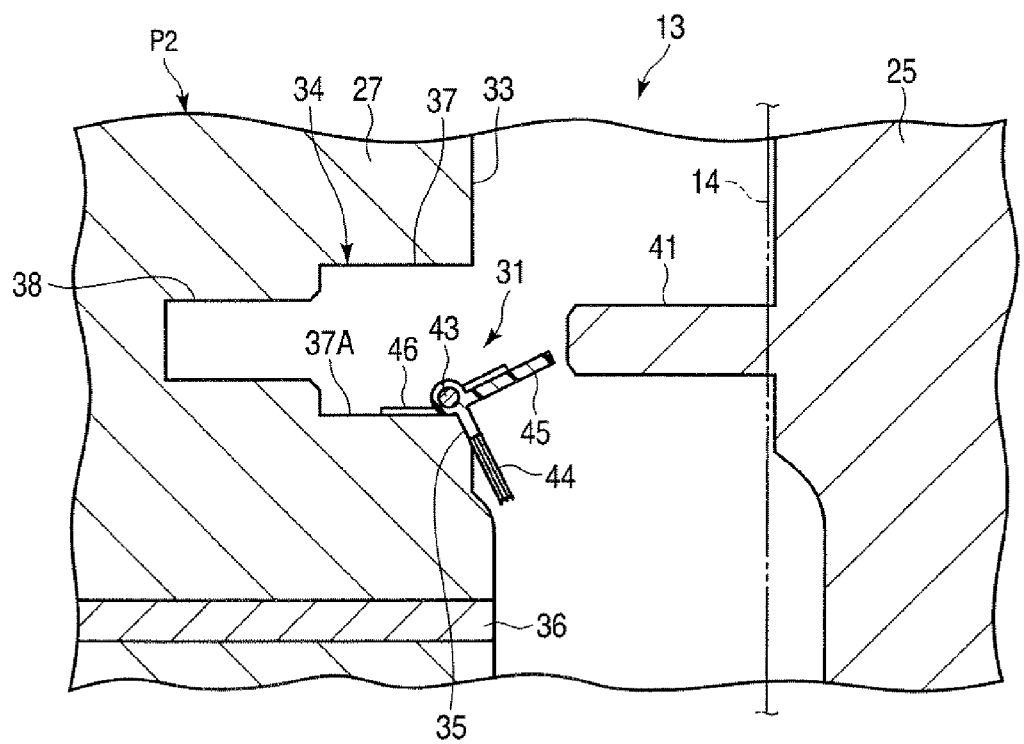
F I G. 4
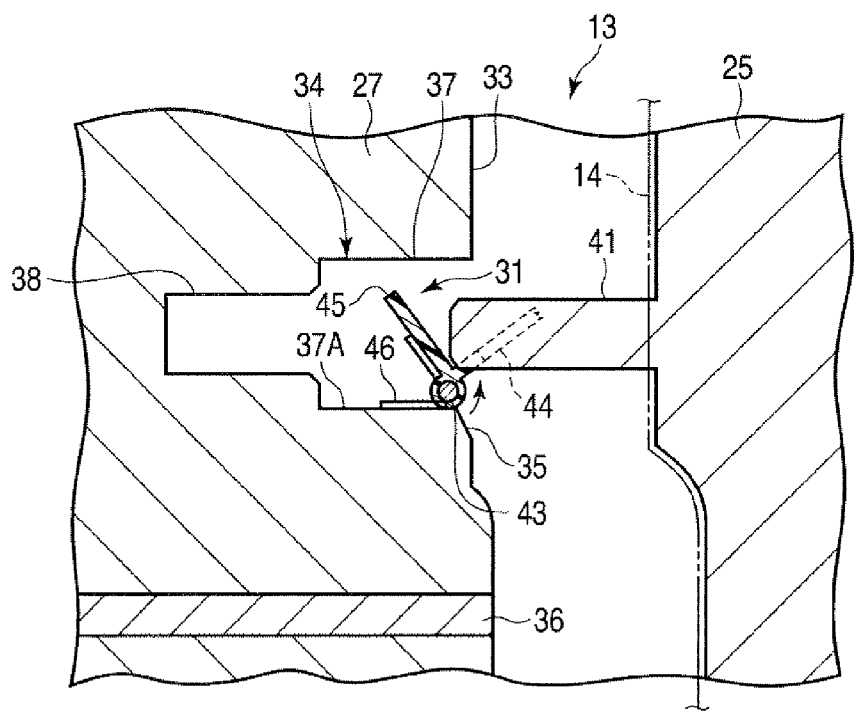
F I G. 5

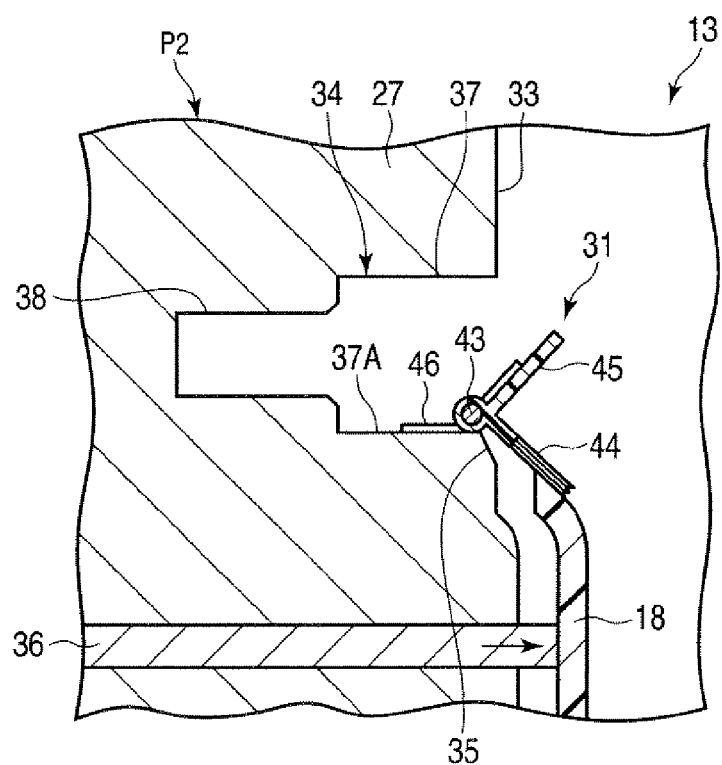
F I G. 8
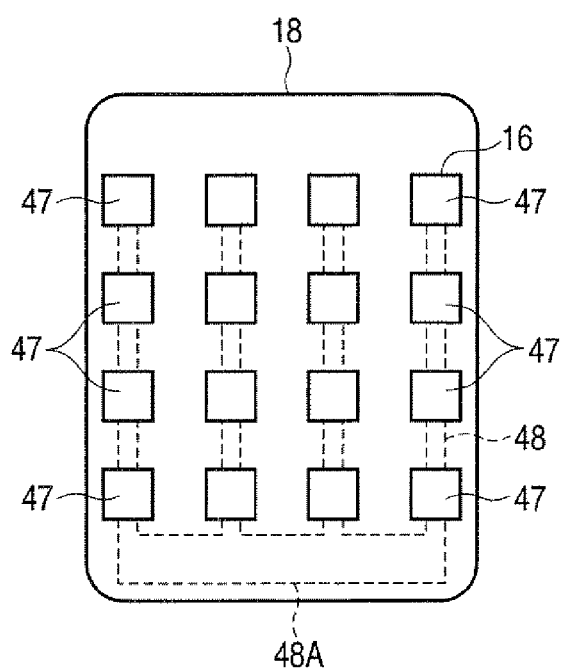
F I G. 9

INJECTION MOLDING MACHINE HAVING AN ELECTRICAL DISCHARGE SYSTEM

CROSS-REFERENCE TO RELATED APPLICATIONS

This application is based upon and claims the benefit of priority from Japanese Patent Application No. 2009-026266, filed Feb. 6, 2009, the entire contents of which are incorporated herein by reference.

BACKGROUND

1. Field

One embodiment of the present invention relates to an injection molding machine configured to perform in-mold formation.

2. Description of the Related Art

Jpn. Pat. Appln. KOKAI Publication No. 10-128787 discloses a mold used for in-mold system. An overlay film is set between the convex die and concave die of the mold in the state where the overlay film is heated and softened. Subsequently, the air is discharged from inside the concave die through small holes communicating between the interior and exterior of the concave die, in such a manner that the film comes into tight contact with the inner surface of the concave die. Molten resin is injected into the mold from the injection port provided in the convex die. When the molten resin is cooled and hardened in the mold, the film is laid over the resin. In this manner, a plastic molded product is completed.

A molding product of in-mold system is sometimes coated with a metallic thin film so that the product has a high-quality appearance. When the metallic film is used, it may be electrostatically charged. If the static electricity is left as it is, it may be discharged when the molding product is pulled out from the mold, causing a current to flow from the molding product to the mold. If this happens, an opening may be formed in the metallic thin film. Although the molding product has to be discharged, this operation is performed by the operator during the molding cycle. Specifically, the operator discharges the metallic thin film by use of a discharge gun or a discharge brush. As a result, the cycle time required for molding is inevitably long, resulting in poor manufacturing efficiency.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary front view schematically showing the major portion of the injection molding machine depicted in FIG. 1.

FIG. 4 is an exemplary sectional view illustrating how the first die, second die and discharge brush shown in FIG. 2 operate.

FIG. 5 is an exemplary sectional view showing a state where the pin of the first die engages with the discharge brush shown in FIG. 4.

FIG. 8 is an exemplary sectional view showing a state where a molded product has been ejected by use of the ejector pin of the second die shown in FIG. 7.

FIG. 9 is an exemplary front view of metallic sheets (foil) provided for the molded product shown in FIG. 8.

DETAILED DESCRIPTION

Various embodiments according to the invention will be described hereinafter with reference to the accompanying drawings. In general, according to one embodiment of the invention, an injection molding machine includes a first die and a second die, a driving mechanism configured to move the second die between the first position and the second position, a holder configured to hold a film for in-mold formation, the film including metallic sheets used for covering the surface of the molded product, and an electric discharge mechanism. The electrical discharge mechanism is moved to a contact position with movement of the second die from the first position to the second position, used as a driving source. The electrical discharge mechanism is moved to a retracted position with movement of the second die from the second position to the first position, used as a driving source.

An injection molding machine according to the first embodiment will now be described with reference to FIGS. 1 through 11. The injection molding machine of the first embodiment is configured to perform in-mold system wherein the surface of a molded resin product is coated with a transfer film such as metallic sheets (foil).

Figure 1:
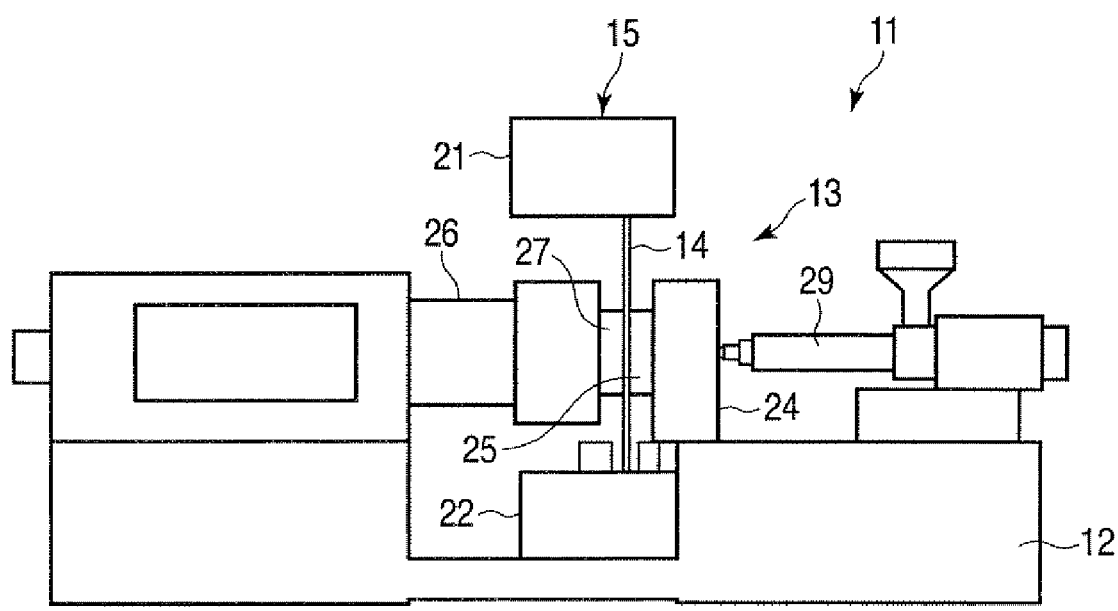
FIG. 1 is an exemplary front view of an injection molding machine according to a first embodiment.

As shown in FIGS. 1 and 2, an injection molding machine 11 comprises a pedestal 12, an injection molding mechanism 13 provided on the pedestal 12, and a film supply mechanism 15 configured to supply a film 14 used for in-mold printing to the injection molding mechanism 13. The film 14 comprises a base film 17 stretched in the vertical direction, and metallic sheets 16 (serving as transfer films) arranged on the surface of the base film 17, for example, at equal intervals. The metallic sheets 16 are coated on a molded product 18 in such a manner that the surface of the molded product 18 is covered. In other words, the appearance of the molded product 18 is improved.

The film supply mechanism 15 is provided on the pedestal 12. The film supply mechanism 15 is a holder configured to hold the film 14 such that the film 14 is located between a first die 25 and a second die 27. The film supply mechanism 15 comprises a supply section 21 configured to supply the base film 17 and the metallic sheets 16 (transfer films), and a recovery section 22 configured to recover the base film 17 from the injection molding mechanism 13. Each of the supply section 21 and the recovery section 22 comprises a plurality of rollers 23 configured to feed the film 14 in the feeding direction. The base film 17 has a face opposed to the second die 27 (which will be detailed later) and a face which is opposite to that face. The metallic sheets 16 are provided on the face opposed to the second die 27.

Figure 3:
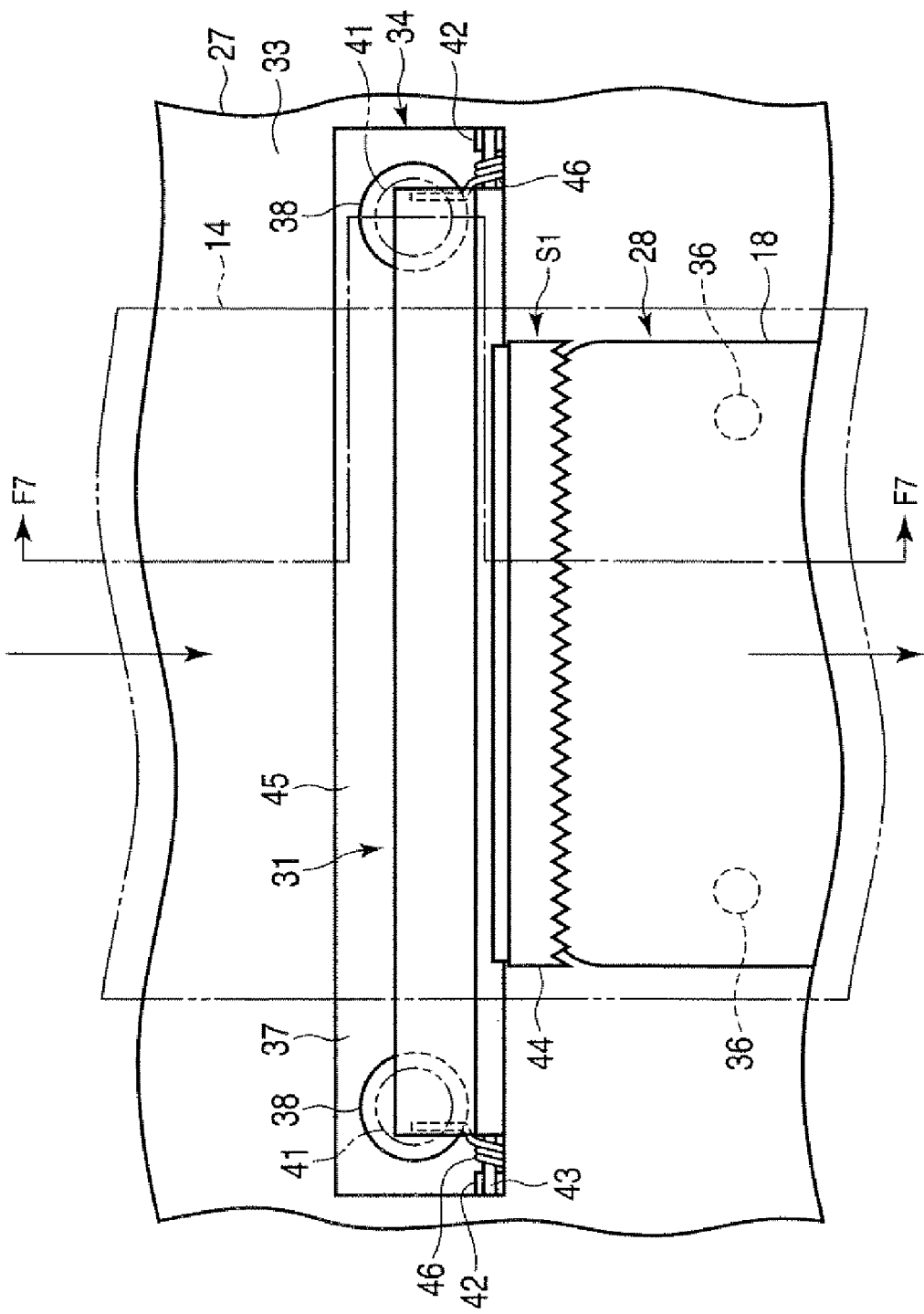
FIG. 3 is an exemplary enlarged front view showing how the second die of the injection molding machine shown in FIG. 2 looks like when it is viewed from a position in front of the second die.

As shown in FIGS. 1 through 3, the injection molding mechanism 13 comprises the following: a cavity block 24; the first die 25 which is a cavity die provided for the cavity block 24; a core block 26 which is opposite to the cavity block 24, with the film 14 located therebetween; the second die 27 which is a core die provided for the core block 26; a resin supply section 29 configured to supply synthetic resin into an internal space 28 (a cavity) between the first die 25 and the second die 27; a discharge brush 31 configured to remove static electricity from the molded product 18; and the molded product 18 formed in the internal space 28. The film 14 is located between the first die 25 and the second die 27.

The core block 26 is a toggle-joint driving mechanism (a fastening unit) configured to make the second die 27 movable. To be more specific, the core block 26 is configured to move the second die 27 between a first position P1 where the second die 27 is in contact with the first die 25 and a second position P2 where the second die 27 is separate from the first die 25. The cavity block 24 is fixedly supports the first die 25.

As shown in FIGS. 3 and 4, the second die 27 comprises: a groove-like depression 34 which is depressed from a parting-line face 33; a stopper 35 with which the main body 44 (which is to be mentioned later) of the discharge brush 31 collides; and an injector pin 36 configured to detach the molded product 18 from the second die 27. The depression 34 is located upstream of the internal space 28. The depression 34 includes a first storage section 37 configured to store the discharge brush 31 therein, and a second storage section 38 formed at a position deeper than the first storage section 38. A pin 41 (which is to be mentioned later) of the first die 25 is inserted into the second storage section 38. As shown in FIG. 4, the stopper 35 is configured to hold the main body 44 of the discharge brush 31 at a position in the neighborhood of the contact position S1 (the main body 44 being brought into contact with the stopper 35).

The first die 25 comprises a pair of cylindrical pins 41, which art to be inserted into the corresponding depression 34. The pins 41 are located outward of the internal space 28 and correspond in position to corner portions of the internal space 28. The pins 41 are located upstream of the internal space 28 with respect to the feeding direction of the film 14. Although not shown, the first die 25 comprises a nozzle serving as a supply port from which molten synthetic resin is to be supplied into the internal space 28.

Figure 6:
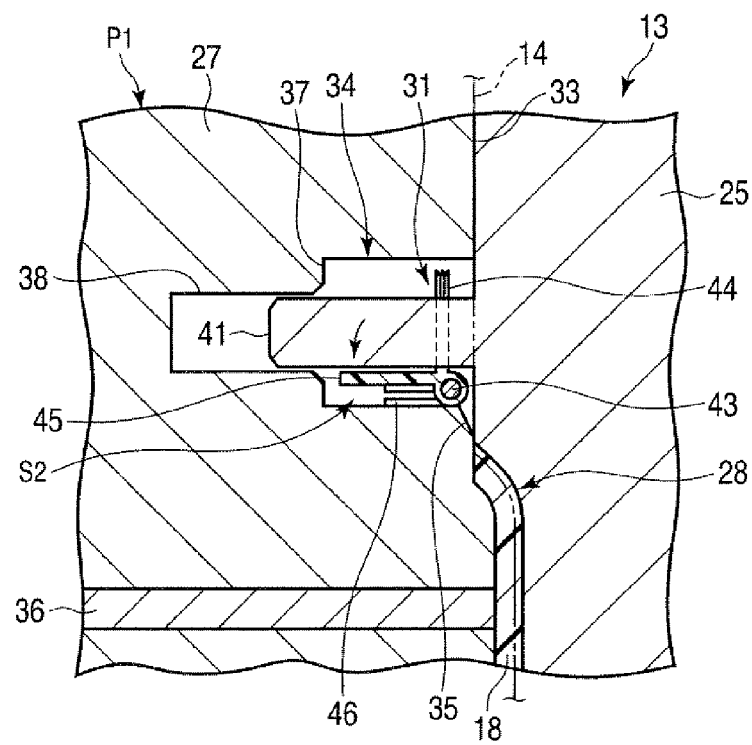
FIG. 6 is an exemplary sectional view showing a state where the discharge brush shown in FIG. 5 has been moved to a retracted position.
Figure 7:
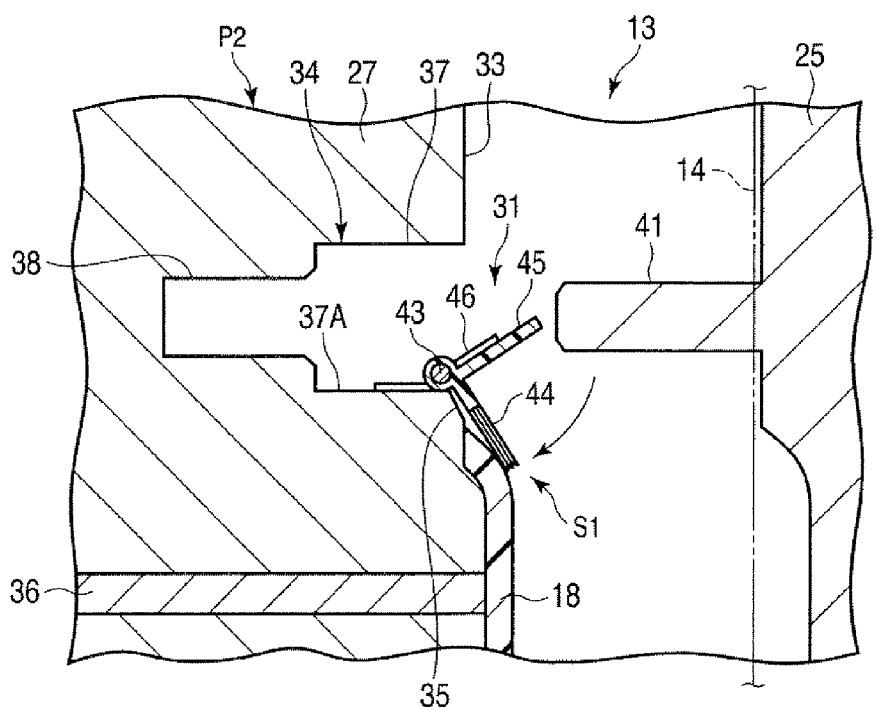
FIG. 7 is an exemplary sectional view taken along line F7-F7 shown in FIG. 3 and illustrating a state where the discharge brush shown in FIG. 6 has been moved to a contact position.

The discharge brush 31 is provided within the second die 27. To be more specific, the discharge brush 31 is located inside the depression 34. The discharge brush 31 comprises: a support shaft 43 attached to a fixing portion 42 inside the depression 34; a main body 44 extending in a radial direction of the support shaft 43 and being rotatable relative to the support shaft 43; and a receiving portion 45 extending in a radial direction of the support shaft 43 that is different from the direction of the main body 44. As shown in FIG. 3, the main body 44 is greater than the width of the molded product 18. The main body 44 is rotatable between a contact position S1 where the main body 44 is in contact with the metallic sheets 16 of the molded product 18 as shown in FIGS. 3 and 7, and a retracted position S2 where the main body 44 is retracted from between the first die 25 and the second die 27 as shown in FIG. 6. The discharge brush 31 comprises a spring member 46 configured to urge the main body 44 toward the contact position S1.

The main body 44 and the receiving portion 45 are integrally formed in such a manner that they form a substantially "L" shape. The main body 44 and the receiving portion 45 are integrally formed by use of a synthetic resin or metal having high heat resistance. The spring member 46 is a torsion coil spring. The spring member 46 is located around the support shaft 43 and between the circumferential wall 37A of the first storage section 37 and the receiving portion 45.

A description will now be given as to how the discharge brush 31 of the first embodiment operates, with reference to FIGS. 4 to 8. As shown in FIG. 4, in the state where the second die 27 is at the second position P2, the discharge brush 31 is pushed against the stopper 35 by the urging force of the spring member 46, and is located in the neighborhood of the contact position S1. When the second die 27 moves from the second position P2 toward the first position P1, the pin 41 of the first die 25 comes into contact with the tip end of the receiving portion 45 of the discharge brush 31. As shown in FIG. 5, when the pin 41 is pushed further, the receiving portion 45 and the main body 44 rotate. As shown in FIG. 6, when the second die 27 moves to the first position P1, the main body 44 is folded and moved to the retracted position 32. Then, the pin 41 is inserted into the second storage section 38, which is the deeper one of the storage sections.

Molten synthetic resin is supplied to the internal space 28, and the molded product 18 has metallic sheets 16 on the surface thereof. As shown, for example, in FIG. 9, the metallic sheets 16 form a first conductive pattern 47 which is an ornamental pattern exposed in the surface, and a second conductive pattern 48 which is covered with paint and is not exposed in the surface. The second conductive pattern 48 includes a belt portion 48A which is shaped like a belt. The belt portion 48A is located at a position corresponding to the position of the main body 44 of the discharge brush 31 located at the contact position S1. The belt portion 48A is formed in such a manner that its length is substantially equal to the overall width of the molded product 18.

As shown in FIG. 7, when the second die 27 moves from the first position P1 to the second position P2, the pin 41 separates from the receiving portion 45, and the main body 44 moves from the retracted position S2 to the contact position S1. As a result, the main body 44 of the discharge brush 31 comes into contact with the belt portion 48A of the molded product 18, thereby removing static electricity from the molded product 18. In addition, as shown in FIG. 8, the ejector pin 36 is pushed and the molded product 18 separates from the second die 27. As shown in FIG. 8, the discharge brush 31 keeps brushing the surface of the belt portion 48A of the molded product 18 in the meantime, and the molded product 18 is electrically discharged in the meantime.

Figure 10:
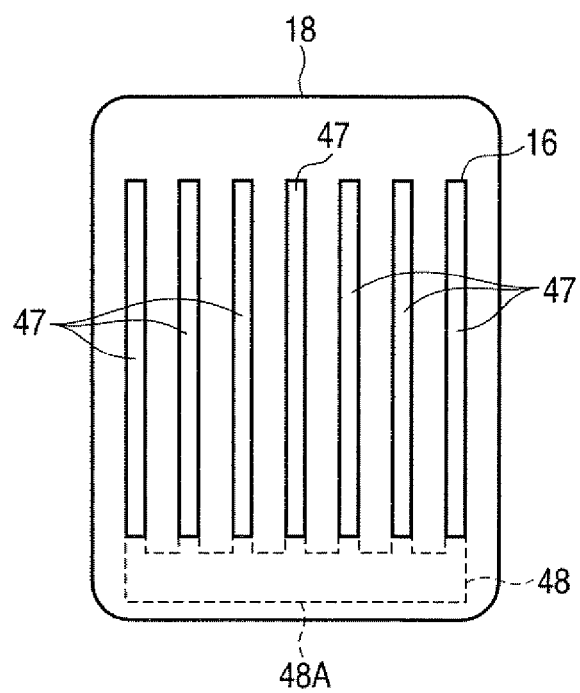
FIG. 10 is an exemplary front view illustrating the first modification of the metallic sheets shown in FIG. 9.
Figure 11:
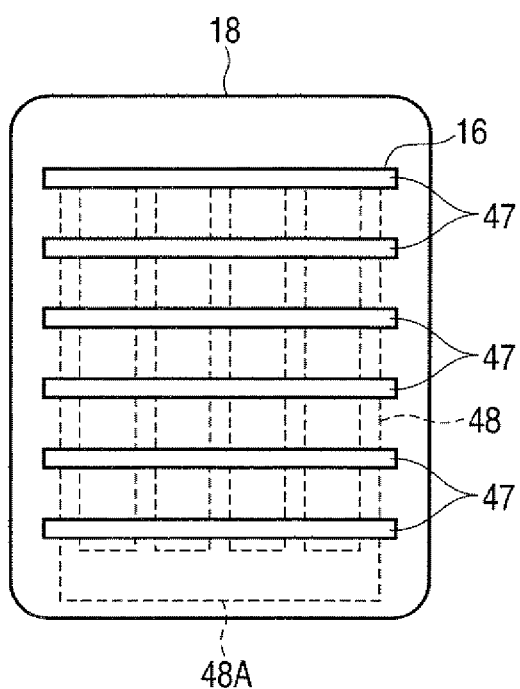
FIG. 11 is an exemplary front view illustrating the second modification of the metallic sheets shown in FIG. 9.

Although, in the first embodiment, the conductive patterns of the molded product 18 have such a configuration as is shown in FIG. 9, the conductive patterns are in no way limited to that configuration. For example, the first conductive pattern 47 and the second conductive pattern 48 may have such configurations as are shown in FIGS. 10 and 11. In other words, the first conductive pattern 47 and the second conductive pattern 48 may have any shapes as long as the belt portion 48A of the second conductive pattern 48 is located at a position corresponding that of the main body 44 of the discharge brush 31.

The injection molding machine 11 of the first embodiment comprises the following: the first and second dies 25 and 27 used for forming the molded product 18; the driving mechanism configured to move the second die 27 between the first position P1 where the second die 27 is in contact with the first die 25 and the second position P2 where the second die 27 is separate from the first die 25; the holder configured to hold the film 14 for in-mold printing (the metallic sheets 16 used for covering the surface of the molded product 18 are provided on the face of the film 14 opposed to the second die 27) such that the film 14 is located between the first die 25 and the second die 27; and the electrical discharge mechanism located in the neighborhood of the second die 27, being moved to the contact position S1 where the electrical discharge mechanism is in contact with the metallic sheets 16 on the surface of the molded product 18 with movement of the second die 27 from the first position P1 to the second position P2, used as a driving source, and being moved to the retracted position S2 where the electrical discharge mechanism is retracted from between the first die 25 and the second die 27, with movement of the second die 27 from the second position P2 to the first position P1, used as a driving source.

The configuration described above enables the electrical discharge mechanism to contact the metallic sheets 16 provided on the molded product 18 when the first die 25 and the second die 27 are separated from each other. Thus, static electricity can be reliably removed from the metallic sheets 16. Owing to this feature, the operation which the operator had to perform manually by use of a discharge gun or the like can be automated, and the electrical discharge can be performed reliably without depending upon how the operator performs the electrical discharge. In addition, the cycle time required for forming one molded product can be shortened, and the efficiency of the manufacturing process can be improved. Furthermore, since the electrical discharge mechanism is movable between the contact position S1 and the retracted position S2 in response to the movement of the second die 27, the electrical discharge mechanism need not be driven by use of an actuator or the like. The electrical discharge mechanism can be simplified, accordingly.

The electrical discharge mechanism is provided within the second die 27. With this structure, the space required for the electrical discharge mechanism can be as little as possible, and the entire injection molding machine 11 can be provided in little space.

The second die 27 has a depression 34 which is depressed from a parting-line face 33, and the electrical discharge mechanism is arranged inside the depression 34. With this structure, the second die 27 of the electrical discharge mechanism can be arranged within the second die 27, and a structure for enabling less installation space can be easily realized.

The first die 25 comprises a pin 41 to be inserted into the depression 34. The electrical discharge mechanism comprises a support shaft 43, a main body 44 rotatable relative to the support shaft 43, and a receiving portion 45 which is integral with the main body 44 and extends in a different direction from that of the main body 44. The receiving portion 45 is rotated when it is pushed by the pin 41, and the rotation of the receiving portion 45 moves the main body 44 to the retracted position S2.

With the above structure, the pin 41, the main body 44 and the receiving portion 45 constitute an electric discharge mechanism having a simple structure. Since a driving source for moving the main body 44 of the electrical discharge mechanism need not be provided, the electrical discharge mechanism can be simplified, accordingly.

The electrical discharge mechanism comprises a spring member 46 configured to urge the main body 44 toward the contact position S1. Since this structure permits the main body 44 of the electrical discharge mechanism to come into reliable contact with a molded product 18, the static electricity can be removed with enhanced reliability. The second die 27 comprises a stopper 35, and the main body 44 pushed against the stopper 35 is held in the neighborhood of the contact position S1. With this structure, the main body 44 urged toward the contact position S1 by the spring member 46 can be kept in a standby state, with a predetermined posture maintained. Accordingly, the pin 41 can be reliably pushed against the receiving portion 45, and the electrical discharge mechanism can be actuated in response to the movement of the second die 27.

The metallic sheets 16 form a conductive pattern, and this conductive pattern is provided at a position corresponding to the main body 44 located in the contact position S1. Since this structure permits the main body 44 of the electrical discharge mechanism to come into reliable contact with the conductive pattern, the static electricity can be removed from a molded product 18 with high reliability.

A description will now be given of an injection molding machine according to the second embodiment, with reference to FIGS. 12 and 13. The injection molding machine 11 of the second embodiment differs from that of the first embodiment in that a discharge brush 51 does not comprise a spring member 46, but is similar with respect to the other structures. The following description will therefore focus mainly on the differences the second embodiment has over the first embodiment. The structural components or elements that are similar to those of the first embodiment will be denoted by the same reference symbols, and a repetitive description of such components or elements will be omitted.

Figure 12:
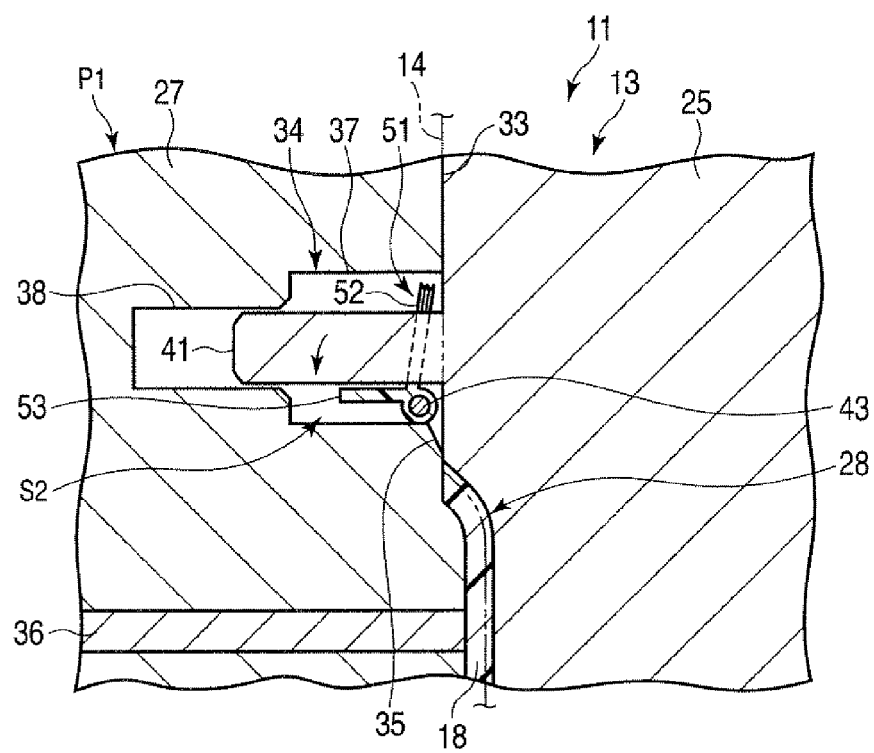
FIG. 12 is an exemplary sectional view showing a state where the discharge brush of the injection molding machine according to the second embodiment has been moved to a retracted position.

As shown in FIG. 12, the discharge brush 51 is provided within a second die 27. The discharge brush 51 comprises: a support shaft 43 attached to a fixing portion 42 inside a depression 34; a main body 52 extending in a radial direction of the support shaft 43 and being rotatable relative to the support shaft 43; and a receiving portion 53 extending in a radial direction of the support shaft 43 that is different from the direction of the main body 52. The main body 52 is rotatable between a contact position S1 where the main body 52 is in contact with metallic sheets 16 of a molded product 18 as shown in FIG. 13, and a retracted position S2 where the main body 44 is retracted from between the first die 25 and the second die 27 as shown in FIG. 12.

The main body 52 and the receiving portion 53 are integrally formed of a synthetic resin or metal having high heat resistance, in such a manner that they form a substantially "L" shape.

Next, a description will be given as to how the discharge brush 51 of the second embodiment operates, with reference to FIGS. 12 and 13. In the state where the second die 27 is at the second position P2, the discharge brush 51 is in contact with the stopper 35 due to the weight of the discharge brush 51, and is located in the neighborhood of the contact position S1. When the second die 27 moves from the second position P2 toward the first position P1, the pin 41 of the first die 25 comes into contact with the tip end of the receiving portion 53 of the discharge brush 51. As shown in FIG. 12, when the pin 41 is pushed further, the receiving portion 53 and the main body 52 rotate, and the main body 52 is moved to the retracted position S2. At the time, the pin 41 is inserted into the second storage section 38, which is the deeper one of the storage sections.

Molten synthetic resin is supplied into the internal space 28, and the molded product 18 has metallic sheets 16 on the surface thereof. The molded product 18 is formed in the manner shown in FIG. 9, for example.

Figure 13:
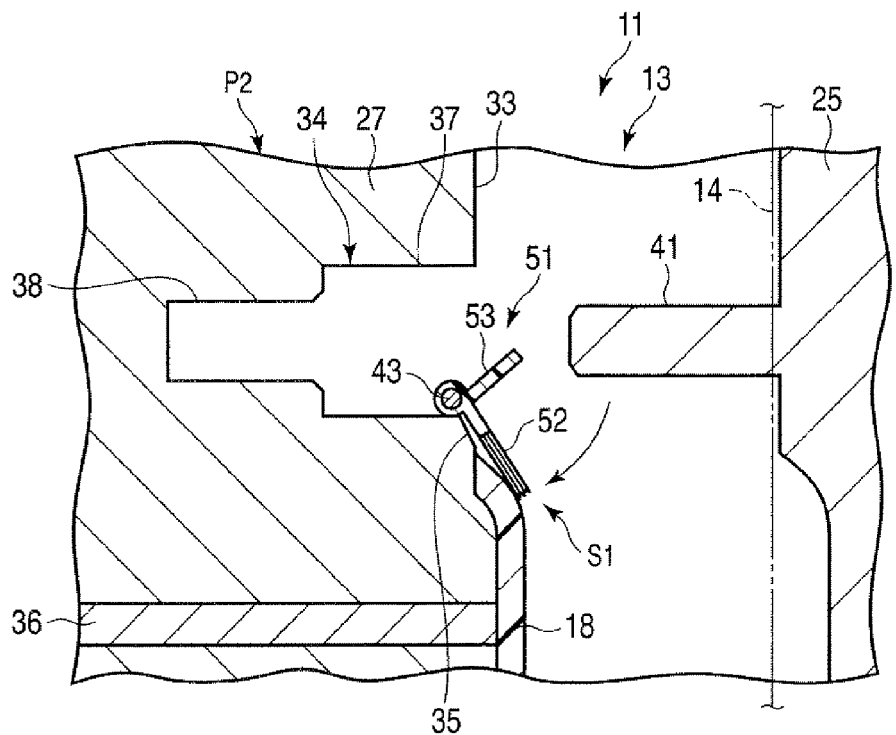
FIG. 13 is an exemplary sectional view showing a state where the discharge brush depicted in FIG. 12 has been moved to a contact position.

As shown in FIG. 13, When the second die 27 moves from the first position P1 to the second position P2, the pin 41 separates from the receiving portion 53, and the main body 52 moves from the retracted position S2 to the contact position S1 due to the weight of the main body 52. As a result, the main body 52 of the discharge brush 51 comes into contact with the belt portion 48A of the molded product 18, thereby removing static electricity from the molded product 18. In addition, the ejector pin 36 is pushed, and the molded product 18 separates from the second die 27.

In the second embodiment, the discharge brush 51 moves from the retracted position S2 to the contact position S1 due to the weight of the discharge brush 51. As in the first embodiment, the discharge brush 51 need not be driven by use of an actuator or the like. The discharge brush 51 can be further simplified, accordingly.

A description will now be given of an injection molding machine according to the third embodiment, with reference to FIGS. 14 and 15. The injection molding machine 11 of the third embodiment differs from that of the first embodiment in that a discharge brush 31 is provided outside a second die 27, but is similar with respect to the other structures. The following description will therefore focus mainly on the differences the third embodiment has over the first embodiment. The structural components or elements that are similar to those of the first embodiment will be denoted by the same reference symbols, and a repetitive description of such components or elements will be omitted.

In the third embodiment, the second die 27 comprises: a stopper 35 with which the main body 44 of the discharge brush 31 collides; and an injector pin 36 configured to detach a molded product 18 from the second die 27.

A first die 25 comprises a pair of cylindrical pins 41, which are to come into contact with the discharge brush 31. The pins 41 are located outward of the first die 25. The pins 41 are located upstream of the internal spaces 28 of both the first die 25 and the second die 27 with respect to the feeding direction of the film 14.

Figure 14:
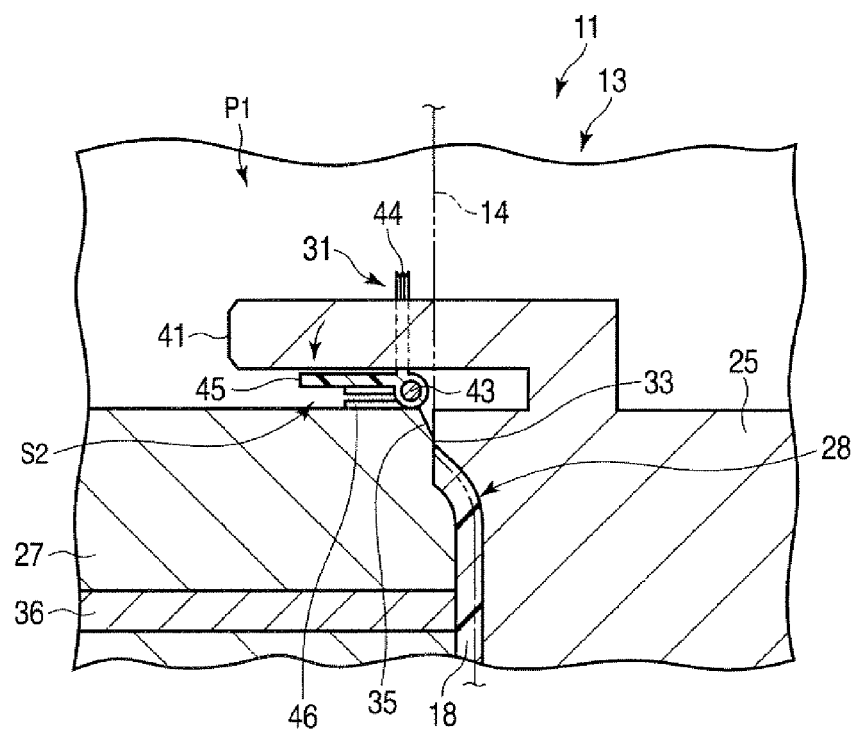
FIG. 14 is an exemplary sectional view showing a state where the discharge brush of the injection molding machine according to the third embodiment has been moved to a retracted position.
Figure 15:
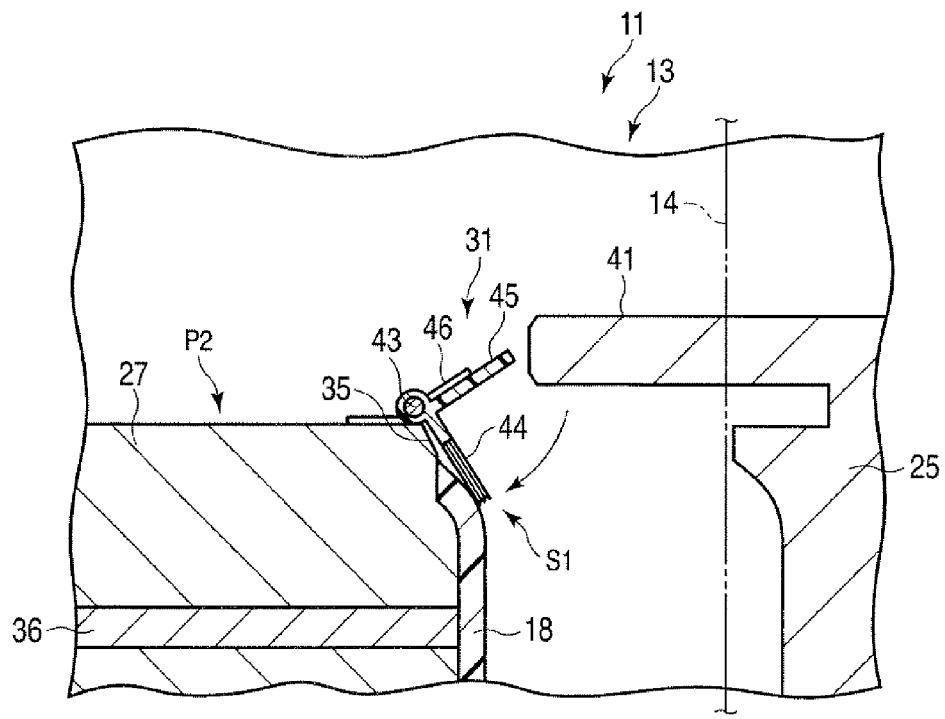
FIG. 15 is an exemplary sectional view showing a state where the discharge brush depicted in FIG. 14 has been moved to a contact position.

As shown in FIGS. 14 and 15, a discharge brush 31, which is an electrical discharge mechanism, is located upstream of the second die 27, namely, at a position outward of the second die 27. The discharge brush 31 comprises: a support shaft 43 attached to the upper face of the second die 27; a main body 44 extending in a radial direction of the support shaft 43 and being rotatable relative to the support shaft 43; and a receiving portion 45 extending in a radial direction of the support shaft 43 that is different from the direction of the main body 44. As shown in FIG. 15, the main body 44 is rotatable between a contact position S1 where the main body 44 is in contact with the metallic sheets 16 of the molded product 18 as shown in FIG. 15, and a retracted position S2 where the main body 44 is retracted from between the first die 25 and the second die 27 as shown in FIG. 14. The discharge brush 31 comprises a spring member 46 configured to urge the main body 44 toward the contact position S1.

The main body 44 and the receiving portion 45 are integrally formed of a synthetic resin or metal having high heat resistance, in such a manner that they form a substantially "L" shape.

A description will now be given as to how the discharge brush 31 of the third embodiment operates, with reference to FIGS. 14 and 15. In the state where the second die 27 is at the second position P2, the discharge brush 31 is pushed against the stopper 35 by the urging force of the spring member 46, and is located in the neighborhood of the contact position S1. When the second die 27 moves from the second position P2 toward the first position P1, the pin 41 of the first die 25 comes into contact with the tip end of the receiving portion 45 of the discharge brush 31. As shown in FIG. 14, when the pin 41 is pushed further, the receiving portion 45 and the main body 44 rotate, and the main body 44 is moved to the retracted position S2.

Molten synthetic resin is supplied into the internal space 28, and the molded product 18 has metallic sheets 16 on the surface thereof. The molded product 18 is formed in the manner shown in FIG. 9, for example.

When the second die 27 moves from the first position P1 to the second position P2, the pin 41 separates from the receiving portion 45, as shown in FIG. 15, and the main body 44 moves from the retracted position S2 to the contact position S1. As a result, the main body 44 of the discharge brush 31 comes into contact with the belt portion 48A of the molded product 18, thereby removing static electricity from the molded product 18. In addition, the ejector pin 36 is pushed, and the molded product 18 separates from the second die 27.

In the third embodiment, the electrical discharge mechanism is located outward of the second die 27. Even though the discharge mechanism is located outward of the second die 27, it need not be driven by use of an actuator or the like. The discharge mechanism can be simplified, accordingly.

A description will now be given of an injection molding machine according to the fourth embodiment, with reference to FIGS. 16 and 17. The injection molding machine 11 of the fourth embodiment differs from that of the first embodiment in that a discharge brush 51 does not comprise a spring member 46 and is provided outside a second die 27, but is similar with respect to the other structures. The following description will therefore focus mainly on the differences the fourth embodiment has over the first embodiment. The structural components or elements that are similar to those of the first embodiment will be denoted by the same reference symbols, and a repetitive description of such components or elements will be omitted.

In the fourth embodiment, the second die 27 comprises: a stopper 35 with which the main body 44 of the discharge brush 51 collides; and an injector pin 36 configured to detach a molded product 18 from the second die 27.

A first die 25 comprises a pair of cylindrical pins 41, which are to come into contact with the discharge brush 51. The pins 41 are located outward of the first die 25. The pins 41 are located upstream of the internal spaces 28 of both the first die 25 and the second die 27 with respect to the feeding direction of the film 14.

Figure 16:
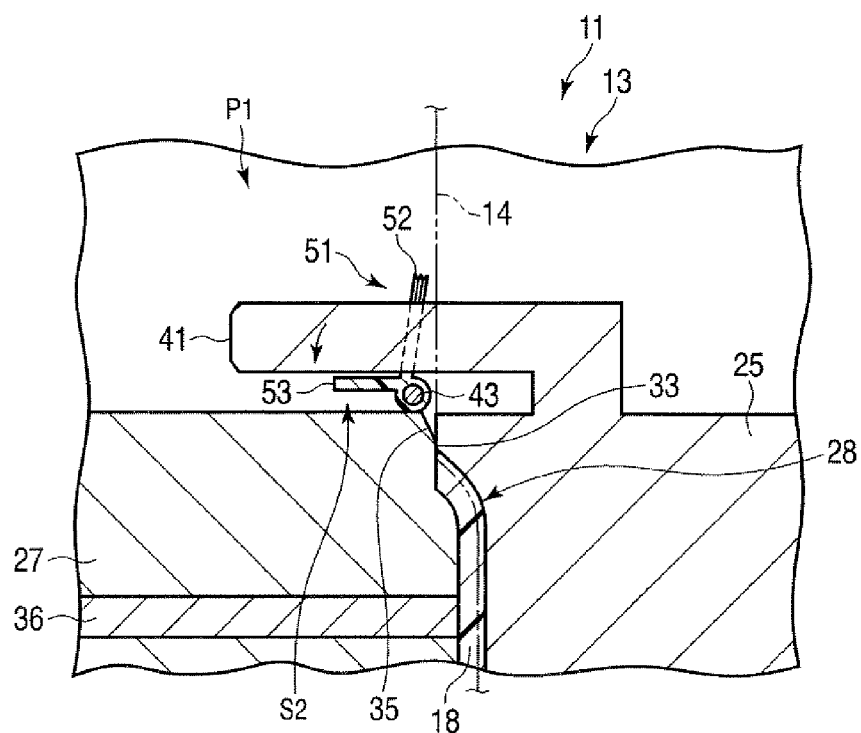
FIG. 16 is an exemplary sectional view showing a state where the discharge brush of the injection molding machine according to the fourth embodiment has been moved to a retracted position.
Figure 17:
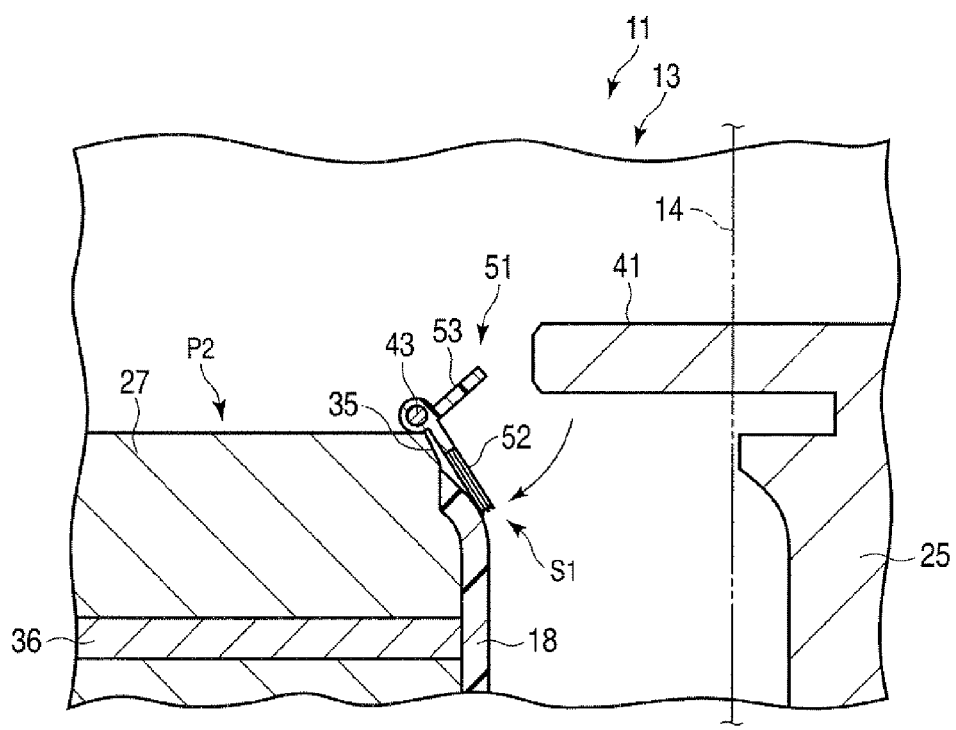
FIG. 17 is an exemplary sectional view showing a state where the discharge brush depicted in FIG. 16 has been moved to a contact position.

As shown in FIGS. 16 and 17, a discharge brush 51, which is an electrical discharge mechanism, is located upstream of the second die 27, namely, at a position outward of the second die 27. The discharge brush 51 comprises: a support shaft 43 attached to the upper face of the second die 27; a main body 52 extending in a radial direction of the support shaft 43 and being rotatable relative to the support shaft 43; and a receiving portion 53 extending in a radial direction of the support shaft 43 that is different from the direction of the main body 52. The main body 52 is rotatable between a contact position S1 where the main body 52 is in contact with the metallic sheets 16 of the molded product 18 as shown in FIG. 17, and a retracted position S2 where the main body 44 is retracted from between the first die 25 and the second die 27 as shown in FIG. 16.

A description will now be given as to how the discharge brush 51 of the fourth embodiment operates, with reference to FIGS. 16 and 17. In the state where the second die 27 is at the second position P2, the discharge brush 51 is in contact with the stopper 35 due to the weight of the discharge brush 51, and is located in the neighborhood of the contact position S1. When the second die 27 moves from the second position P2 toward the first position P1, the pin 41 of the first die comes into contact with the tip end of the receiving portion 53 of the discharge brush 51. As shown in FIG. 16, when the pin 41 is pushed further, the receiving portion 53 and the main body 52 rotate, and the main body 52 is moved to the retracted position S2.

Molten synthetic resin is supplied into the internal space 28, and the molded product 18 has metallic sheets 16 on the surface thereof. The molded product 18 is formed in the manner shown in FIG. 9, for example.

When the second die 27 moves from the first position P1 to the second position P2, the pin 41 separates from the receiving portion 53 as shown in FIG. 17, and the main body 52 moves from the retracted position S2 to the contact position S1, due to the weight of the main body 52. As a result, the main body 52 of the discharge brush 51 comes into contact with the belt portion 48A of the molded product 18, thereby removing static electricity from the molded product 18. In addition, the ejector pin 36 is pushed, and the molded product 18 separates from the second die 27.

In the fourth embodiment, the discharge brush 51 moves from the retracted position S2 to the contact position S1 due to the weight of the discharge brush 51. The discharge brush 51 need not be driven by use of an actuator or the like, and the discharge brush 51 can be further simplified, accordingly. In the fourth embodiment, furthermore, the electrical discharge mechanism is located outward of the second die 27. Even where the electrical discharge mechanism is arranged outside the second die 27, it has a simple structure.

Needless to say, the injection molding machine of each embodiment can be modified in various manners without departing from the spirit and scope of the present invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An injection molding machine comprising:
   a first die and a second die;
   a driving mechanism configured to move the second die between a first position where the second die is in contact with the first die and a second position where the second die is separate from the first die;
   a holder configured to hold a film for in-mold printing such that the film is located between the first die and the second die, the film comprising metallic sheets used for covering a surface of a molded product on a face opposed to the second die; and
   an electrical discharge mechanism located inside a depression depressed from a parting line face of the second die and movable between a contact position where the electrical discharge mechanism is in contact with the metallic sheets and a retracted position where the electrical discharge mechanism is retracted from between the first and second dies, wherein
   the first die comprises a pin to be pushed against the electrical discharge mechanism,
   the electrical discharge mechanism comprises a support shaft, a main body rotatable relative to the support shaft, and a receiving portion being integral with the main body and extending in a different direction from that of the main body, and
   the receiving portion is rotated and moves the main body to the retracted position when the pin pushes the receiving portion.

2. The injection molding machine of claim 1, wherein the electrical discharge mechanism comprises a spring member configured to urge the main body toward the contact position.

3. The injection molding machine of claim 1, wherein the second die comprises a stopper, and the stopper is configured to hold the main body near the contact position when the main body is brought into contact with the stopper.

4. An injection molding machine comprising:
   a first die and a second die;
   a driving mechanism configured to move the second die between a first position where the second die is in contact with the first die and a second position where the second die is separate from the first die;
   a holder configured to hold a film for in-mold printing such that the film is located between the first die and the second die, the film comprising metallic sheets used for covering a surface of a molded product on a face opposed to the second die; and
   an electrical discharge mechanism located outward of the second die and movable between a contact position where the electrical discharge mechanism is in contact with the metallic sheets and a retracted position where the electrical discharge mechanism is retracted from between the first and second dies, wherein
   the first die comprises a pin to be pushed against the electrical discharge mechanism,
   the electrical discharge mechanism comprises a support shaft, a main body rotatable relative to the support shaft, and a receiving portion being integral with the main body and extending in a different direction from that of the main body, and
   the receiving portion is rotated and moves the main body to the retracted position when the pin pushes the receiving portion.

5. The injection molding machine of claim 4, wherein the electrical discharge mechanism comprises a spring member configured to urge the main body toward the contact position.

6. The injection molding machine of claim 4, wherein the second die comprises a stopper, and the stopper is configured to hold the main body near the contact position when the main body is brought into contact with the stopper.

7. An injection molding machine comprising:
a first die;
a second die;
a driving mechanism configured to move the second die between a first position where the second die is in contact with the first die and a second position where the second die is separate from the first die;
a holder configured to hold a film for in-mold printing such that the film is located between the first die and the second die, the film comprising metallic sheets used for covering a surface of a molded product on a face opposed to the second die; and
an electrical discharge mechanism located inside a depression depressed from a parting line face of the second die and movable between a contact position where the electrical discharge mechanism is in contact with the metallic sheets and a retracted position where the electrical discharge mechanism is retracted from between the first and second dies,
wherein the first die comprises a pin to be pushed against the electrical discharge mechanism,
the electrical discharge mechanism comprises a shaft portion, a main body rotatable relative to the shaft portion, and a receiving portion being integral with the main body and extending in a different direction from that of the main body, and
the receiving portion is rotated and moves the main body to the retracted position when the pin pushes the receiving portion.

8. An injection molding machine comprising:
a first die;
a second die;
a driving mechanism configured to move the second die between a first position where the second die is in contact with the first die and a second position where the second die is separate from the first die;
a holder configured to hold a film for in-mold printing such that the film is located between the first die and the second die, the film comprising metallic sheets used for covering a surface of a molded product on a face opposed to the second die; and
an electrical discharge mechanism located outward of the second die and movable between a contact position where the electrical discharge mechanism is in contact with the metallic sheets and a retracted position where the electrical discharge mechanism is retracted from between the first and second dies,
wherein the first die comprises a pin to be pushed against the electrical discharge mechanism,
the electrical discharge mechanism comprises a shaft portion, a main body rotatable relative to the shaft portion, and a receiving portion being integral with the main body and extending in a different direction from that of the main body, and
the receiving portion is rotated and moves the main body to the retracted position when the pin pushes the receiving portion.

* * * * *